United States Patent
Itoko et al.

(10) Patent No.: US 9,721,221 B2
(45) Date of Patent: Aug. 1, 2017

(54) SKILL ESTIMATION METHOD IN MACHINE-HUMAN HYBRID CROWDSOURCING

(71) Applicant: International Business Machines Corporation, Armonk, NY (US)

(72) Inventors: Toshinari Itoko, Tokyo (JP); Masatomo Kobayashi, Tokyo (JP); Shin Saito, Tokyo (JP); Toshihiro Watanabe, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/869,308

(22) Filed: Sep. 29, 2015

(65) Prior Publication Data

US 2016/0132815 A1    May 12, 2016

(30) Foreign Application Priority Data

Nov. 7, 2014    (JP) .................................. 2014-226645

(51) Int. Cl.
  *G06Q 10/00*    (2012.01)
  *G06Q 10/06*    (2012.01)
  *G06Q 50/00*    (2012.01)

(52) U.S. Cl.
  CPC ....... *G06Q 10/06398* (2013.01); *G06Q 50/01* (2013.01); *G06Q 10/0639* (2013.01)

(58) Field of Classification Search
  CPC .................................................. G06Q 10/0639
  (Continued)

(56) References Cited

U.S. PATENT DOCUMENTS

2009/0287546 A1*  11/2009  Gillespie ........... G06F 17/30241
                                                            705/5
2012/0029978 A1*   2/2012  Olding .................. G06Q 10/06
                                                            705/7.42

(Continued)

FOREIGN PATENT DOCUMENTS

JP    02068658 A    3/1990
JP    10261122 A    9/1998

(Continued)

OTHER PUBLICATIONS

Dawid, A.P. et al., "Maximum Likelihood Estimation of Observer Error-Rates Using the EM Algorithm," Journal of the Royal Statistical Society, Series C (Applied Statistics), vol. 28, No. 1, 1979, pp. 20-28.

(Continued)

*Primary Examiner* — Sujay Koneru
(74) *Attorney, Agent, or Firm* — Laura E. Gisler

(57)    ABSTRACT

In one embodiment, a computer-implemented method for estimating an ability of a worker in a process for integrating work results of multiple workers for the same task includes acquiring, for each of one or more tasks, a work result of a preceding-stage worker and a work result of a succeeding-stage worker that works based on the work result of the preceding-stage worker. The method also includes estimating multiple parameters of a probability model in which an ability of the succeeding-stage worker conditioned by a quality of the work result of the preceding-stage worker is introduced as a conditioned ability parameter, based on the multiple work results obtained for each of the one or more tasks.

13 Claims, 8 Drawing Sheets

(58) Field of Classification Search
USPC .......................................................... 705/7.38
See application file for complete search history.

(56) References Cited

U.S. PATENT DOCUMENTS

| | | | |
|---|---|---|---|
| 2014/0039870 A1* | 2/2014 | Roy ..................... | G06F 17/2854 704/2 |
| 2015/0213360 A1* | 7/2015 | Venanzi ........... | G06Q 10/06311 706/12 |
| 2015/0242447 A1* | 8/2015 | Ipeirotis ............ | G06F 17/30303 705/14.45 |
| 2015/0356488 A1* | 12/2015 | Eden ...................... | G06Q 50/01 705/7.41 |

FOREIGN PATENT DOCUMENTS

| | | |
|---|---|---|
| JP | 2001243341 A | 9/2001 |
| JP | 2004151895 A | 5/2004 |
| JP | 2007026135 A | 2/2007 |
| JP | 2008084051 A | 4/2008 |
| JP | 2014074966 A | 4/2014 |

OTHER PUBLICATIONS

Kobayashi, M. et al., "Age-based Task Specialization for Crowdsourced Proofreading," Universal Access in Human-Computer Interaction, User and Context Diversity, 2013, pp. 104-112.
Kacorri, H. et al., "Introducing Game Elements in Crowdsourced Video Captioning by Non-Experts," Proceedings of the 11th Web for All Conference, ACM, Apr. 2014, pp. 1-4.
Whitehill, J. et al., "Whose Vote Should Count More: Optimal Integration of Labels from Labelers of Unknown Expertise," NIPS, vol. 22, pp. 2035-2043, Dec. 2009.
Welinder, P. et al., "The Multidimensional Wisdom of Crowds," In Proceedings of the 24th Annual Conference on Neural Information Processing Systems (NIPS), 2010, pp. 1-9.
Donmez, P., et al., "Efficiently Learning the Accuracy of Labeling Sources for Selective Sampling," In Proceedings of the 15th ACM SIGKDD International Conference on Knowledge Discovery and Data Mining, ACM, Jun. 30, 2009, pp. 259-268.

* cited by examiner $$\alpha_i = p(\ y_{it} = z_t\ |\ o_t = z_t\ )$$

$$\beta_i = p(\ y_{it} = z_t\ |\ o_t \neq z_t\ )$$

SKILL ESTIMATION METHOD IN MACHINE-HUMAN HYBRID CROWDSOURCING

This invention was made with Japanese Government support awarded by the Japan Science and Technology Agency (JST). The Japanese Government has certain rights in this invention.

BACKGROUND

The present invention relates to a process for integrating results of works performed by multiple workers, and more particularly to an estimation method, an estimation system, a computer system and a program for estimating abilities of multiple workers in a process for integrating results of works performed by the workers.

Recently, attention has been paid to crowdsourcing in which works are entrusted to an unspecified large number of workers. In crowdsourcing, the same task is entrusted to a lot of workers, work results are integrated, and an integrated work result of the task is obtained. It is possible to obtain the work result with a higher quality by performing the integration appropriately.

In the case of attempting to integrate answers from a lot of workers to obtain a correct answer, a simple method is thought of, which uses majority voting to determine the correct answer. In the case of simple majority voting, however, differences among correct answer rates of the workers is ignored. Therefore, there is proposed a technique for improving the accuracy of the obtained answer by estimating skills of the workers (for example, correct answer rates) and the degree of difficulty of works and, thereby, performing weighted integration.

In the conventional technique mentioned above, however, it is assumed that individual workers create answers from the beginning. Therefore, the technique is not sufficiently compatible with a step-by-step workflow in which succeeding-stage workers work based on a work result of a preceding-stage worker. In one example, modification may be performed based on a result of Automatic Speech Recognition (ASR) for work of voice or video transcription. In another example, a workflow includes a person modifying a result of Optical Character Recognition (OCR) for work of digitization of a book.

In the above workflows, there is a possibility that succeeding-stage workers are influenced by seeing the answer of a preceding-stage worker. For example, there is a possibility that a worker exists who has a tendency of believing an automatic recognition result and not modifying wrong recognition, and a worker who has, on the contrary, a tendency of being suspicious and excessively modifying even correct recognition.

From the background described above, there has been a demand for development of a technique capable of, in a workflow in which succeeding-stage workers work based on a work result of a preceding-stage worker for the same task, and work results of these workers are integrated, estimating the behaviors and skills of the workers more accurately and performing integration with higher accuracy.

BRIEF SUMMARY

In one embodiment, a computer-implemented method for estimating an ability of a worker in a process for integrating work results of multiple workers for the same task includes acquiring, for each of one or more tasks, a work result of a preceding-stage worker and a work result of a succeeding-stage worker that works based on the work result of the preceding-stage worker. The method also includes estimating multiple parameters of a probability model in which an ability of the succeeding-stage worker conditioned by a quality of the work result of the preceding-stage worker is introduced as a conditioned ability parameter, based on the multiple work results obtained for each of the one or more tasks.

In another embodiment, an estimation system for estimating an ability of a worker in a process for integrating work results of multiple workers for the same task includes an acquisition section configured to acquire, for each of one or more tasks, a work result of a preceding-stage worker and a work result of a succeeding-stage worker that works based on the work result of the preceding-stage worker. The estimation system also includes an estimation section configured to estimate multiple parameters of a probability model in which an ability of the succeeding-stage worker conditioned by a quality of the work result of the preceding-stage worker is introduced as a parameter, based on the multiple work results obtained for each of the one or more tasks.

According to yet another embodiment, a computer system for estimating an ability of a worker in a process for integrating work results of multiple workers for the same task includes a processor and a memory communicating with the processor. The processor is configured to acquire, for each of one or more tasks, a work result of a preceding-stage worker and a work result of a succeeding-stage worker that works based on the work result of the preceding-stage worker. The processor is also configured to estimate multiple parameters of a probability model in which an ability of the succeeding-stage worker conditioned by a quality of the work result of the preceding-stage worker is introduced as a parameter, based on the multiple work results obtained for each of the one or more tasks.

In another embodiment, a computer-readable program product for estimating an ability of a worker in a process for integrating work results of multiple workers for the same task. The program product causes a computer system to function as an acquisition section configured to acquire, for each of one or more tasks, a work result of a preceding-stage worker and a work result of a succeeding-stage worker that works based on the work result of the preceding-stage worker. The program product also causes the computer system to function as an estimation section configured to estimate multiple parameters of a probability model in which an ability of the succeeding-stage worker conditioned by a quality of the work result of the preceding-stage worker is introduced as a parameter, based on the multiple work results obtained for each of the one or more tasks.

In another embodiment, a computer-readable program product for integrating work results of multiple workers for the same task causes a computer system to function as an acceptance section configured to present a work result of a preceding-stage worker to one or more succeeding-stage workers and accept a work result from each of the one or more succeeding-stage workers, for a task. The computer-readable program product also causes the computer system to function as a results integration section configured to estimate a work result to be obtained for the task as a result of integrating the work results of the multiple workers based on a probability model in which an ability of each succeeding-stage worker conditioned by a quality of the work result of the preceding-stage worker is introduced as a parameter.

Other aspects and embodiments of the present invention will become apparent from the following detailed description, which, when taken in conjunction with the drawings, illustrate by way of example the principles of the invention.

DETAILED DESCRIPTION

Figure 1:
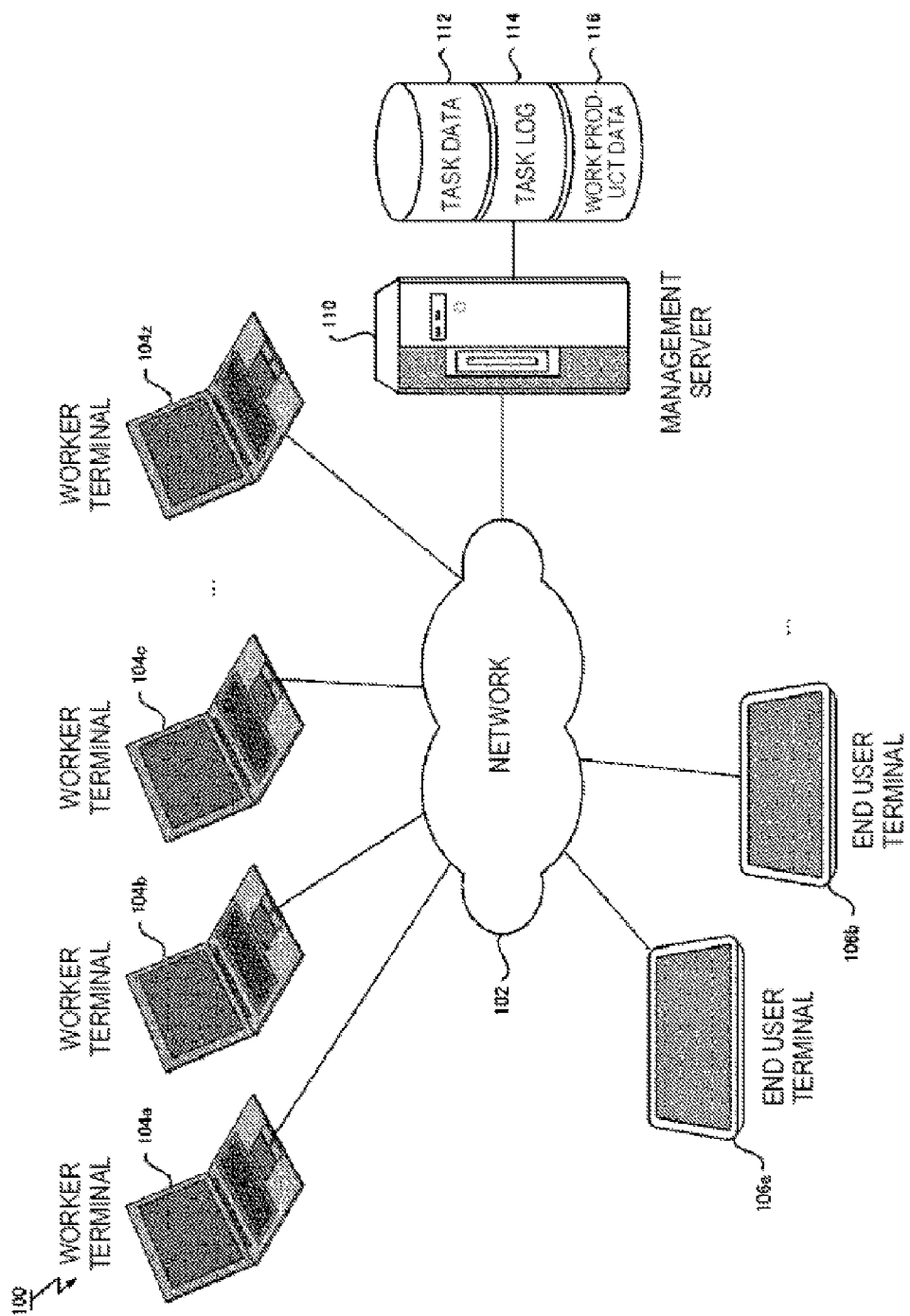
FIG. 1 is a network configuration diagram of a work results integration system according to an embodiment.

The present invention has been made in view of the inadequate points in the above conventional techniques, and an object of the embodiments described herein is to provide an estimation method, an estimation system, a computer system and a program capable of estimating abilities of succeeding-stage workers that may fluctuate according to the quality of a work result of a preceding-stage worker. Another object of the embodiments described herein is to provide a program for performing a process for integrating work results of multiple workers while estimating the abilities of the succeeding-stage workers that may fluctuate according to the quality of a work result of the preceding-stage worker.

In order to solve the problems described above, one embodiment described herein provides an estimation method having the following features. In the estimation method, a computer system acquires, for each of one or more tasks, a work result of a preceding-stage worker and a work result of a succeeding-stage worker that works based on the work result of the preceding-stage worker. Then, the computer system estimates multiple parameters of a probability model in which abilities of the succeeding-stage worker conditioned by a quality of the work result of the preceding-stage worker are introduced as a parameter based on the multiple work results obtained for each of the one or more tasks. Thereby, the abilities of multiple workers in a process for integrating work results of the multiple workers for the same task are estimated.

Further, according to one embodiment described herein, there is provided an estimation system for estimating abilities of multiple workers in a process for integrating work results of the multiple workers for the same task. The estimation system includes an acquisition section configured to acquire, for each of one or more tasks, a work result of a preceding-stage worker and a work result of a succeeding-stage worker that works based on the work result of the preceding-stage worker. The estimation system further includes an estimation section configured to estimate multiple parameters of a probability model in which abilities of the succeeding-stage worker conditioned by a quality of the work result of the preceding-stage worker are introduced as a parameter, based on the multiple work results obtained for each of the one or more tasks.

Furthermore, according to one embodiment described herein, there is provided a computer system for estimating abilities of multiple workers in a process for integrating work results of the multiple workers for the same task, the computer system comprising a processor and a memory communicating with the processor. The processor of the computer system is configured to acquire, for each of one or more tasks, a work result of a preceding-stage worker and a work result of a succeeding-stage worker and estimate multiple parameters of a probability model in which abilities of the succeeding-stage worker conditioned by a quality of the work result of the preceding-stage worker are introduced as a parameter, based on the multiple work results. Furthermore, according to one embodiment described herein, there is provided a computer-readable program for estimating abilities of multiple workers in a process for integrating work results of the multiple workers for the same task.

Furthermore, according to one embodiment described herein, there is provided a computer-readable program for integrating work results of multiple workers for the same task. This program causes a computer system to function as: an acceptance section configured to present a work result of a preceding-stage worker to one or more succeeding-stage workers and accept a work result from each of the one or more succeeding-stage workers, for a task; and a results integration section configured to estimate a work result to be obtained for the task as a result of integrating the work results of the multiple workers based on a probability model in which abilities of the succeeding-stage worker conditioned by a quality of the work result of the preceding-stage worker are introduced as a parameter.

By the above configuration, it becomes possible to estimate the ability of a succeeding-stage worker that may fluctuate according to the quality of a work result of a preceding-stage worker. Furthermore, it becomes possible to perform processing for integrating work results of multiple workers while estimating the abilities of the succeeding-stage workers that may fluctuate according to the quality of a work result of the preceding-stage worker.

Other effects and advantages of the embodiments described herein will be ascertained from the detailed description explained together with reference to accompanying drawings.

Although embodiments of the present invention are described below, embodiments of the present invention are not limited to the various embodiments described below. In the embodiments described below, a work results integration system 100 for estimating the abilities of multiple workers as an estimation system and integrating work results of the multiple workers will be described as an example.

FIG. 1 is a diagram illustrating a network configuration of the work results integration system 100 according to one embodiment. The work results integration system 100 shown in FIG. 1 includes a management server 110 that communicates with one or more worker terminals 104*a* to 104*z* via a network 102. Here, the network 102 may be any wired or wireless network such as a Local Area Network (LAN), a Wide Area Network WAN), a 3G circuit network, a Long Term Evolution (LTE) circuit network, and the Internet, etc.

Each worker terminal 104 is a terminal operated by a worker who processes a task allocated from the management server 110. The worker terminal 104 may be an information terminal such as a personal computer, a tablet computer or a smartphone although not especially limited thereto.

The management server 110 allocates tasks to workers and collects work results of the tasks from the workers. In the described embodiment, the management server 110 can redundantly allocate the same task to the multiple workers, integrate work results from the multiple workers and generate a final work result for the task.

Here, although the task is not especially limited, various information processing tasks, such as an image processing task, a voice processing task and a text processing task, are possible. As the image processing task, for example, a character recognition task for extracting characters or text from an image and an image classification task for classifying the kinds of images can be given as examples. As the voice processing task, a voice recognition task for performing transcription of characters or text from voice attached data, such as voice data and motion picture data, and a voice classification task for classifying the kinds of voices can be given as examples. As the text processing task, a sentence proofreading task, an inter-language translation task, and a metadata giving task for giving metadata to information, such as a message and an article, can be given as examples.

The management server 110 stores task data 112 in which the tasks to be allocated to the workers are described. When description is made on the character recognition task described above as an example, the task data includes image data of an image part in which characters or text obtained by scanning a book or the like is included. Further, when description is made on the voice recognition task as an example, the task data includes voice data of a voice part including utterances, in which communication voices, lecture video, or the like is recorded. As for other kinds of tasks, details will not be further described.

When receiving work results for a task transmitted from the worker terminals 104, the management server 110 stores the work results as a task log 114. The task log 114 includes a work result obtained from each of one or more workers for each of one or more tasks. When description is made on the character recognition task as an example, the work result includes characters or text recognized from image data. Further, when description is made on the voice recognition task as an example, the work result includes characters or text obtained by transcription from voice attached data.

The management server 110 integrates the work results of the multiple workers for each task included in the task log 114, generates an integrated work result as a consensus of the workers who took charge of the task, and stores the integrated work result as work product data 116. When description is made on the character recognition task or the voice recognition task as an example, the work product data 116 includes characters or text presumed as a consensus.

In the work results integration system 100 shown in FIG. 1, one or more end user terminals 106*a* and 106*b* are further connected to the management server 110 via the network 102. Each end user terminal 106 is a terminal operated by an end user who uses the work product data 116. The end user can use a work product by operating the end user terminal 106 to access the work product data 116. As an example, the end user can use the work product data 116 configured as text attached image data obtained by digitization of a book.

In such a system that integrates multiple redundant work results for the same task from multiple workers to obtain a final work product as described above, it is important to appropriately estimate the abilities of the workers. This is because the qualities of the work results differ according to the workers.

As a method of integrating the multiple work results, majority voting, weighted evaluation according to the abilities of the workers or the like can be performed. For example, the ability of each worker can be estimated as the correct answer rate of each worker. However, in such a step-by-step workflow that succeeding-stage workers work based on a work result of a preceding-stage worker, there is a possibility that the ability and behavior of each worker cannot be sufficiently evaluated by the correct answer rate for each worker described above. This is because there is a possibility that work results of the succeeding-stage workers are influenced by seeing the work result of the preceding-stage worker. Therefore, it is important to appropriately model the influence described above in order to improve the quality of an integrated work result.

For example, there is a possibility that a worker who has a tendency of believing the work result of the preceding-stage worker and not modifying mistakes and a worker who has, on the contrary, a tendency of being suspicious and excessively modifying even a correct result exist. There is a possibility that, by estimating the abilities of succeeding-stage workers that is influenced by the result of a preceding-stage work, according to the quality of a work result of the preceding-stage worker and appropriately modeling the behavior of the workers having the above tendency, integration with higher accuracy can be performed.

Therefore, in the work results integration system 100 according to the embodiment, the management server 110 estimates the abilities of the succeeding-stage workers that may fluctuate according to the quality of a result of a preceding-stage work using a probability model in which the abilities of the succeeding-stage workers conditioned with the quality of a work result of the preceding-stage worker is introduced as parameters. Thereby, the behavior and skills of the succeeding-stage workers dependent on the quality of a result of a preceding-stage work are estimated more accurately to improve the accuracy of integration.

A work results integration process in the work results integration system 100 according to the embodiment is described below with reference to FIG. 2.

Figure 2:
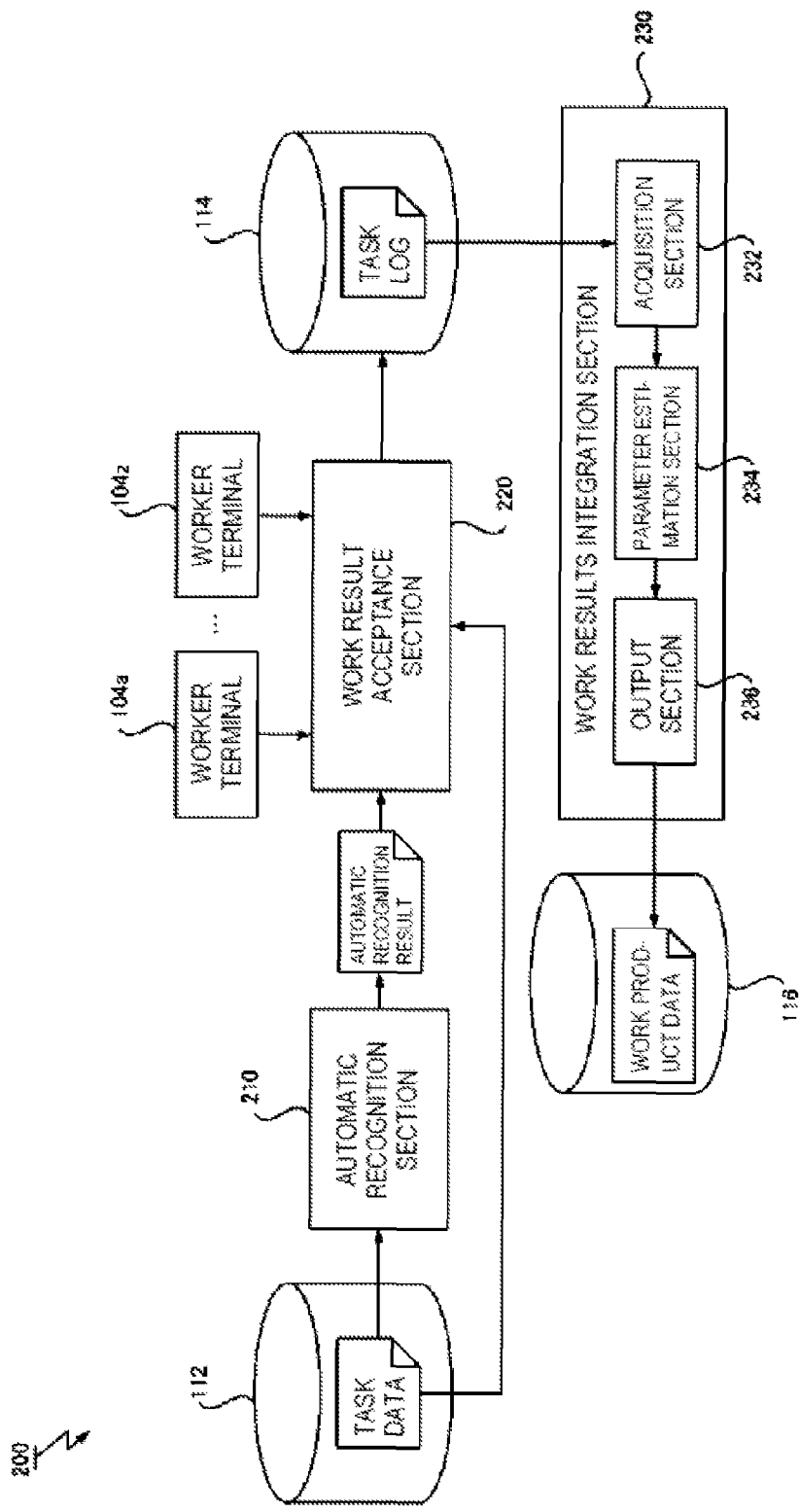
FIG. 2 is a block diagram of the work results integration system according to one embodiment.

FIG. 2 is a block diagram showing the configuration of the work results integration system 100 according to one embodiment. As shown in FIG. 2, a function block 200 of the work results integration system 100 includes an automatic recognition section 210, a work result acceptance section 220 and a work results integration section 230. The function sections 210, 220 and 230 shown in FIG. 2 are typically realized on the management server 110.

The automatic recognition section 210 performs automatic recognition processing of task data by the arithmetic capacity of a computer and outputs an automatic recognition result to the work result acceptance section 220. The automatic recognition section 210 is an Optical Character Recognition (OCR) engine in the case of a character recognition task, and an Automatic Speech Recognition (ASR) engine in the case of a voice recognition task. The automatic recognition section 210 can operate as a preceding-stage worker in the described embodiment.

The work result acceptance section 220 provides a user interface to which the worker terminals 104 operated by workers access and through which the workers perform work for processing a task. Each of the workers of the worker terminals 104 can be either a preceding-stage worker or a succeeding-stage worker, or both of them.

The work result acceptance section 220 transmits task data 112 to be allocated to the worker terminals 104 and requests work for a task from the workers of the worker terminals 104. At that time, the work result acceptance section 220 can present a work result of a preceding-stage worker (including an automatic recognition result by the automatic recognition section 210) that has been already obtained for the task, to the worker terminals 104. The work result acceptance section 220 accepts work results for the task from the worker terminals 104 and stores the work results as a task log 114, associating the work results with pieces of identification information identifying the workers. Further, when accepting an automatic recognition result inputted from the automatic recognition section 210, the work result acceptance section 220 records the automatic recognition result in the task log 114 as a work result from a preceding-stage worker.

The work results integration section 230 reads out accumulated task logs 114 of one or more tasks, estimates the abilities of the workers based on a predetermined probability model, estimates work results to be obtained for the tasks, and generates work product data 116. The work results integration section 230, in more detail, includes an acquisition section 232, a parameter estimation section 234 and an output section 236.

The acquisition section 232 reads out the accumulated task logs 114 and acquires work results of preceding-stage and succeeding-stage workers for each of the one or more tasks. The parameter estimation section 234 estimates a parameter set of the predetermined probability model based on the multiple work results obtained for each of the one or more tasks. For each of the one or more tasks, the output section 236 estimates and outputs a work result to be obtained for the task based on the estimated parameter set. In addition to the work result to be obtained for each of the one or more tasks, the output section 236 can also output a parameter set including the abilities of the workers. Details of the probability model and the estimation of the parameters will be described later.

In the above description, the function sections 210, 220 and 230 shown in FIG. 2 have been described as being realized on the management server 110 which is a computer. However, the function sections 210, 220 and 230 are not limited to this aspect and may be distributed and implemented in parallel in any aspect in a computer system including one or more computers. For example, in another embodiment, the function sections 210, 220 and 230 may be distributed and implemented in different computers, respectively. Further, it is not impossible to, in order to process a more massive amount of data, implement each of the function sections 210, 220 and 230 in multiple computers in parallel.

A parameter estimation process using a probability model which is to be executed in the work results integration system 100 according to the embodiment of the present invention will be described below in more detail with reference to FIGS. 3-5. Although a task may be any information processing task as described above, a character recognition task will be handled as an example in the embodiment described below.

Figure 3:
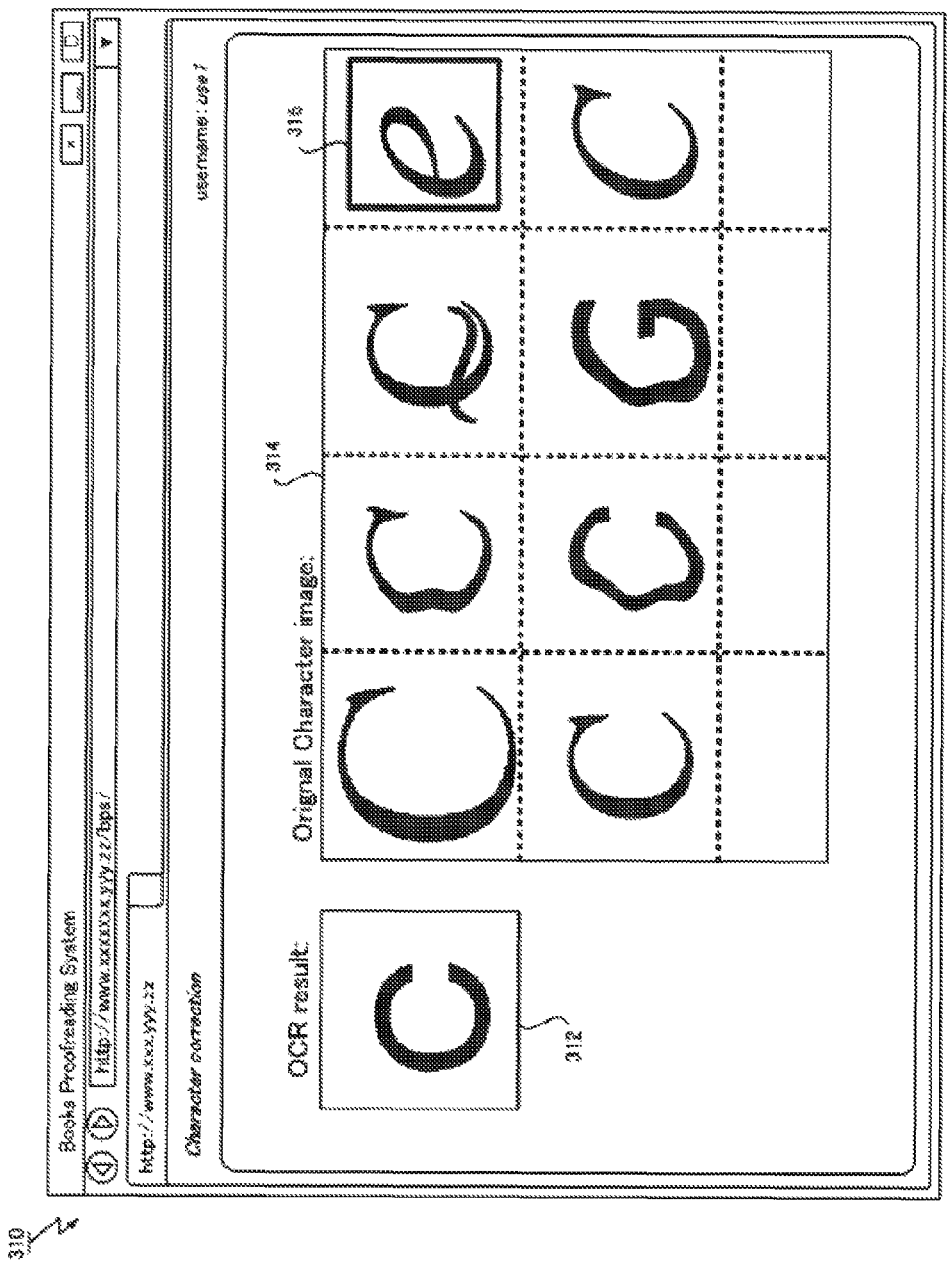
FIG. 3 is a diagram illustrating a character proofreading interface screen for performing proofreading of a character recognition result of an English letter displayed on a worker terminal in a one embodiment.

FIG. 3 illustrates a work screen displayed on the worker terminals 104 in a particular embodiment. FIG. 3 illustrates a character proofreading interface screen on which proofreading of a character recognition result of English letters is being performed.

A screen 310 shown in FIG. 3 includes a display box 312 in which an OCR automatic recognition result, which is a work result of a preceding-stage worker, is displayed and a character image array box 314. In the character image array box 314, one or more original character images that gave the common automatic recognition result are arrayed and displayed. In the display box 312 shown in FIG. 3, an automatic recognition result of "c" in alphabet is shown. In the character image array box 314, one or multiple character images recognized as "c" in alphabet by automatic recognition are shown.

That is, in the screen 310 shown in FIG. 3, multiple tasks corresponding to the number of character images shown in the character image array box 314 are included. The work given to the workers is to, while referring to the OCR automatic recognition result of a preceding-stage worker shown in the display box 312, specify what is recognized to be wrong, among one or multiple character images shown in the character image array box 314 and modify it to a recognition result that the workers think it is correct themselves.

The character image surrounded by a box 316 in FIG. 3 is an image to be recognized as "e" when seen by a person who can understand alphabet; however, the image is misrecognized as "c" in the automatic recognition result by a machine. In this case, the workers perform an operation of selecting the character image shown in the box 316 and inputting the correct character "e" on the screen 310.

In the description below, a step-by-step workflow will be described as an example in which, via a character proofreading interface screen as shown in FIG. 3, an OCR automatic recognition result is presented to succeeding-stage workers as a work result of a preceding-stage worker, and the succeeding-stage workers, who are persons, perform modification for the OCR recognition result as necessary. Therefore, the work results of the workers described above are answers of characters recognized by the workers for a character recognition task, and a work result to be obtained as an integrated result is a true correct answer of a character indicated by an image of the character recognition task.

Figure 4:
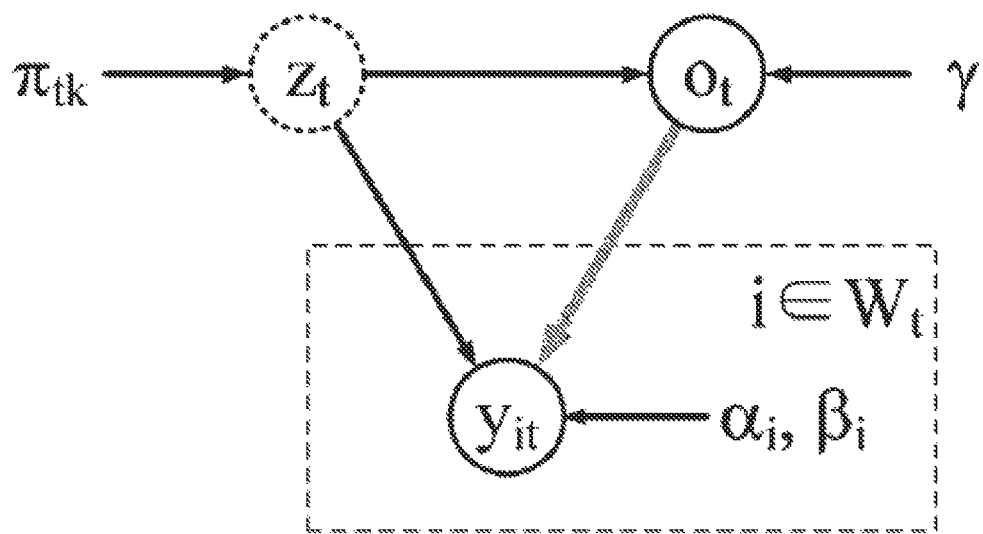
FIG. 4 is a diagram illustrating a stochastic generative model obtained by modeling a step-by-step work flow, which is to be used in the work results integration system according to one embodiment.

FIG. 4 is a diagram illustrating a stochastic generative model in which the step-by-step workflow described above is modeled and which is used in the work results integration system 100 according to one embodiment. FIG. 4 shows a graphical expression of the generative model used in the described embodiment. Here, the generative model is a probability model for explaining from what latent cause an observation result has been generated. What is obtained by expressing this generative model as a diagram is referred to as a graphical expression or a graphical model. Formularization of the abilities of the succeeding-stage workers constituting a generative model used in the described embodiment are shown in the bottom two expressions.

FIG. 4 shows a generative model for each task, and the generative model includes an answer $o_t$ of the OCR engine, which is a preceding-stage worker, and answers $y_{it}$ of the succeeding-stage workers as observed variables (indicated by solid-line circles in FIG. 4) and includes a true correct answer $z_t$ to be obtained as a latent variable (indicated by a dotted line circle in FIG. 4).

Here, t is an index identifying a task, and it is assumed that there are n tasks. As for i, it is an index identifying the succeeding-stage workers, and it is assumed that there are m succeeding-stage workers. All the workers do not necessarily give an answer for each task, and a set of succeeding-stage workers after a task t is performed is indicated by $W_t$. Further, it is assumed that each task is independent from the other tasks and that, when the true correct answer $z_t$ and the answer $o_t$ of the preceding-stage worker are given, answers $y_{it}$ of succeeding-stage workers are mutually independent.

The answer $o_t$ of the preceding-stage worker and the answers $y_{it}$ of the succeeding-stage workers are included in a set of answers X that includes all characters as elements ($o_t \in X$, $y_{it} \in X$). For a certain task t, the number of unique answers included in an answer $o_t$ of the preceding-stage worker and answers $y_{it}$ ($i \in W_t$) of the succeeding-stage workers is indicated by $K_t$. On the assumption that a correct answer of the task t exists in the $K_t$ unique answers k (k=1, ..., $K_t$), it is an objective to estimate a true correct answer $z_t$ ($z_t \in X$) that is latent.

Multiple parameters are given to a generative model. In the generative model shown in FIG. 4, a prior probability $\pi_{tk}$ of the true correct answer $z_t$, a correct answer rate $\gamma$ of the preceding-stage worker, and two kinds of correct answer rates $\alpha_i$ and $\beta_i$ of the succeeding-stage worker i are given as the parameters. The prior probability $\pi_{tk}$ of the true correct answer $z_t$ is expressed by the following formula (1), and it is the prior probability of the true correct answer $z_t$ to be obtained for each task t being the answer k among the $K_t$ unique answers. The correct answer rate $\gamma$ of the preceding-stage worker is expressed by the following formula (2) and indicates the ability of the preceding-stage worker.

$$\pi_{tk} = p(z_t = k) \quad (1)$$

Here, the following is satisfied: $\sum_{k=1}^{K_t} \pi_{tk} = 1$ $$\gamma = p(o_i = z_i) \quad (2)$$

A gray arrow (indicating a conditional probability) in the generative model shown in FIG. 4 is a characteristic part of the generative model in the embodiment that takes account of influence of the quality of a work result of the preceding-stage worker. The two kinds of correct answer rates $\alpha_i$ and $\beta_i$ of the succeeding-stage worker i are expressed as shown in the bottom two equations of FIG. 4 and indicate the abilities of the succeeding-stage workers conditioned by whether or not the preceding-stage worker gives a correct answer. The correct answer rate $\alpha_i$ indicates a probability of the succeeding-stage worker i giving a correct answer ($y_{it}=z_t$) under the condition that the answer of the preceding-stage worker is correct ($o_t=z_t$). On the other hand, the correct answer rate $\beta_i$ indicates a probability of the succeeding-stage worker i giving a correct answer ($y_{it}=z_t$) under the condition that the answer of the preceding-stage worker is incorrect ($o_t \neq z_t$).

As shown in FIG. 4, such a model is constructed that the probabilities (abilities) of succeeding-stage workers giving a correct answer fluctuate according to whether the answer of a preceding-stage worker is correct or incorrect in the embodiment. Thereby, it becomes possible to grasp a worker who has a tendency of believing an answer of a preceding-stage worker, and a tendency of a worker who is suspicious about an answer of a preceding-stage worker.

Further, in a parameter estimation method according to one embodiment, a parameter set ($\alpha_i$, $\beta_i$, $\gamma$ and $\pi_{tk}$) of the generative model shown in FIG. 4 is estimated based on the answers $o_t$ and $y_{it}$ given for each of one or more tasks (t=1, ..., n), and a true correct answer $z_t$ for each of the one or more tasks is estimated.

The parameter estimation method in the embodiment is described below in more detail with reference to FIG. 5. FIG. 5 is a flowchart showing the parameter estimation method executed in the work results integration system in the embodiment described above. FIG. 5 shows a specific flow of performing maximum a posteriori probability (MAP) estimation of a parameter set applying an EM algorithm based on a generative model in which a latent variable and a parameter set as shown in FIG. 4 are introduced, and estimating a true correct answer $z_t$ of a task using the obtained parameter set.

Figure 5:
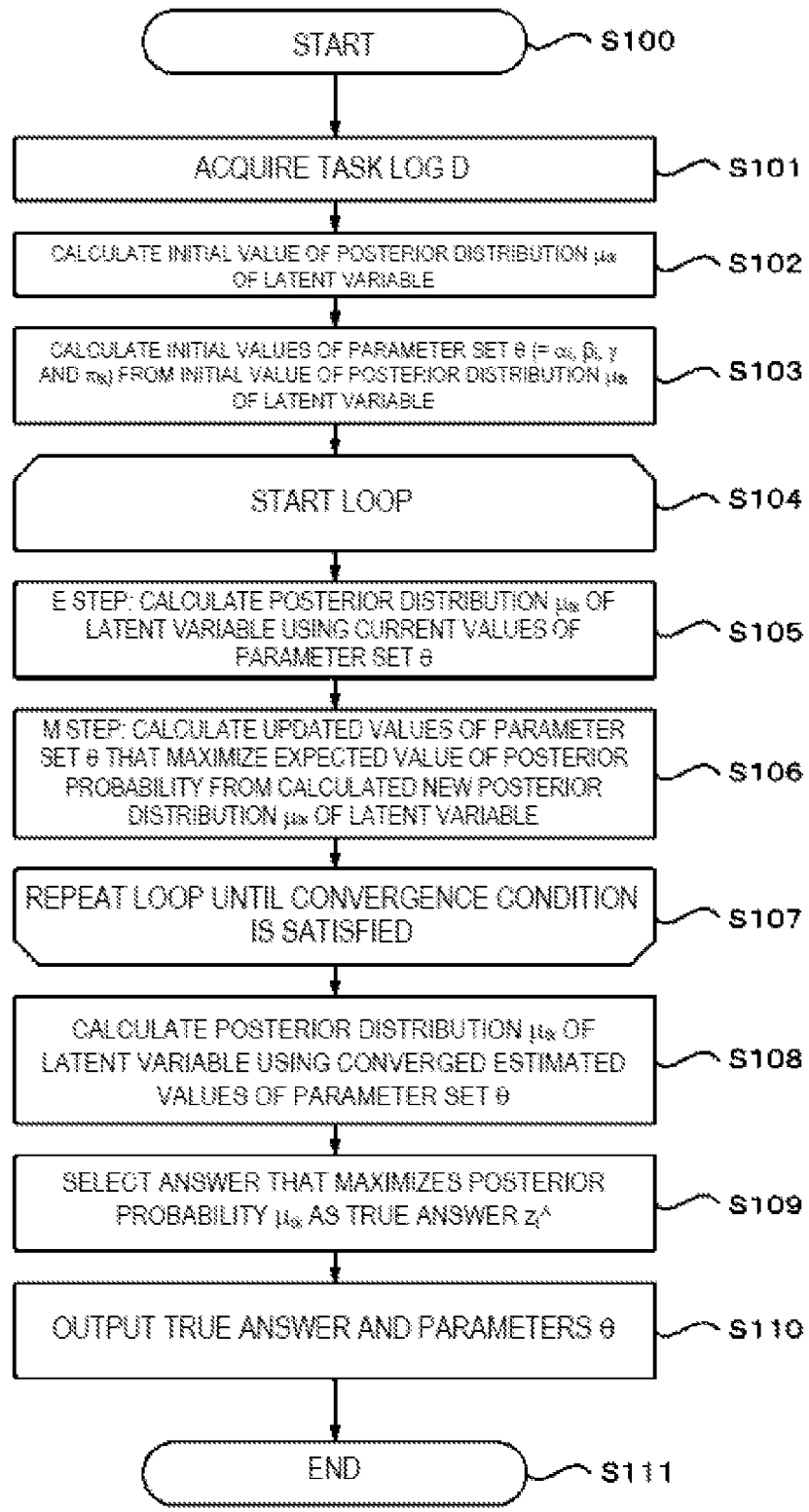
FIG. 5 is a flowchart showing a parameter estimation method executed in the work results integration system according to one embodiment.

Here, before describing the process flow shown in FIG. 5, MAP estimation based on the generative model shown in FIG. 4 is described. The MAP estimation may be formularized like the formula (3) below, and it is a method of estimating the value of a parameter set $\theta$ that maximizes a posterior probability $\rho$ ($\theta|D$) of the parameters when an observed variable D is given. Here, the parameter set $\theta$ is a vector obtained by collecting all the parameters ($\alpha_i$, $\beta_i$, $\gamma$ and $\pi_{tk}$) described above. In the described embodiment, the formula (4) below can be derived from the formula (3) below based on the Bayes' theorem. In the formula (4) below, $\Sigma p$ (D, Z|$\theta$) indicates likelihood, and p ($\theta$) indicates prior distribution of the parameter set $\theta$.

$$\hat{\theta}_{MAP} = \arg\max_{\theta} p(\theta \mid D) \quad (3)$$

$$= \arg\max_{\theta} \left\{ \ln \sum_Z p(D, Z \mid \theta) + \ln p(\theta) \right\} \quad (4)$$

In the formula (4) above, the parameter set $\theta$, the observed variable D and the latent variable Z are expressed by the formulas (5) to (7) below.

$$\theta = \left\{ \{\alpha_i\}_{i=1}^m, \{\beta_i\}_{i=1}^m, \gamma, \{\{\pi_{tk}\}_{k=1}^{K_t}\}_{t=1}^n \right\} \quad (5)$$

$$D = \left\{ \{y_{ti}\}_{t \in W_i}, o_t \right\}_{t=1}^n \quad (6)$$

$$Z = \{z_t\}_{t=1}^n \quad (7)$$

The prior distribution p ($\theta$) in the formula (4) above may be indicated by beta distribution shown in the formulas (8) to (10) below and Dirichlet distribution shown in the formula (11) below for each parameter. In the formulas (8) to (11) below, $a_1$, $a_2$, $b_1$, $b_2$, $g_1$, $g_2$ and $\rho$ are hyper-parameters, and it is assumed that appropriate values are given in advance. In the described embodiment, prior distribution $\pi_{tk}$ of the latent variable is indicated by symmetric Dirichlet distribution with $K_t$ parameters having the same value. In the case of $K_t$=2, the prior distribution $\pi_{tk}$ corresponds to beta distribution.

$$\alpha_i \sim \text{Beta}(a_1, a_2) \quad (8)$$

$$\beta_i \sim \text{Beta}(b_1, b_2) \quad (9)$$

$$\gamma \sim \text{Beta}(g_1, g_2) \quad (10)$$

$$\{\pi_{tk}\}_{k=1}^{K_t} \sim \text{Dirichlet}(\rho/K_t, \ldots, \rho/K_t) \quad (11)$$

That is, in the described embodiment, a problem of estimating correct answer rates $\alpha_i$ and $\beta_i$ of m participating succeeding-stage workers, a correct answer rate $\gamma$ of a preceding-stage worker, and a prior probability $\pi_{tk}$ of each answer k among $K_t$ answers for each of n tasks, based on an answer $o_t$ of the preceding-stage worker for each of the n tasks and answers $y_{it}$ of the succeeding-stage workers as well as estimating a true correct answer $z_t$ for each of the n tasks is formularized.

It is generally difficult to perform calculation of an optimum solution of a problem as shown in the formula (4) above because a sum exists in a logarithm and, therefore, the amount of calculation is large. Therefore, in the described embodiment, an EM algorithm is applied to perform parameter estimation by repeated calculation. A specific process from applying the EM algorithm to perform MAP estimation of a parameter set $\theta$ up to estimating a true correct answer $z_t$ for a task using the obtained parameter set $\theta$ will be described below with reference to the flowchart shown in FIG. 5.

The parameter estimation method shown in FIG. 5 is started at step S100, for example, in response to an instruction to start the process for the predetermined number of task logs as a target. At step S101, the acquisition section 232 acquires a task log D from a task log storage area and develops it in a work area. The hyper-parameters described above are also read out here.

At step S102, the parameter estimation section 234 first calculates an initial value of posterior distribution $\mu_{tk}$ of a variable $z_t$ for each of n tasks t obtained. The initial value of the posterior distribution $\mu_{tk}$ of the latent variable $z_t$ may be equal for the number of unique answers $K_t$. From a viewpoint of causing repeated calculation to converge earlier, however, the initial value can be determined according to majority voting, preferably, as expressed by the formula (12) below. In the formula (12) below, $\delta$ indicates Kronecker delta.

$$\mu_{tk} = \frac{1}{|W_i|} \sum_{i \in w_i} \delta(y_{it}, k) \tag{12}$$

At step S103, the parameter estimation section 234 calculates initial values of a parameter set $\theta$ ($\alpha_i$, $\beta_i$, $\gamma$ and $\pi_{tk}$) from the value of the posterior distribution $\mu_{tk}$ of the latent variable. As for a method of calculation the parameter set $\theta$ from the posterior distribution $\mu_{tk}$, the calculation can be performed with the use of the formulas (17) to (20) below to be used at an M step of the EM algorithm to be described later.

At step S104, a loop is started, and an E (Expectation) step shown at step S105 and the M (Maximization) step shown at step S106 are alternately repeated until it is determined at step S107 that a predetermined convergence condition is satisfied.

At step S105, the parameter estimation section 234 executes the E step in the EM algorithm. Generally, at the E step in the EM algorithm, an expected value R ($\theta||\theta\sim$) of the posterior probability of the parameters, which is expressed by the formula (13) below, is calculated with the use of a current value $\theta\sim$ (superscript tilde) of the parameter set. The formula (13) below corresponds to determination of the lower bound of logarithm likelihood ln p (D, $\theta$). Then, at the succeeding M step, parameters that maximize the expected value (lower bound) determined at the E step are newly determined. Then, by repeating the E step and the M step, parameters that maximize the posterior probability are determined. When being expressed more specifically, the formula (13) below can be expressed by the formula (14) below.

$$R(\theta||\tilde{\theta}) = E_{Z|D,\tilde{\theta}}[\ln p(D, Z | \theta) + \ln p(\theta)] \tag{13}$$

$$R(\theta||\tilde{\theta}) = \sum_{t=1}^{n} \sum_{k=1}^{K_t} \mu_{tk} \ln(\pi_{tk} r_{tk}(\theta)) + \ln p(\theta) \tag{14}$$

In the formula (14) above, $\mu_{tk}$ is posterior distribution of the latent variable $z_t$ when observed data ($D_t = \{\{y_{it}\}_{i \in W_t}, o_t\}$) and the parameter set $\theta\sim$ are given, and it is calculated by the formula (15) below.

$$\mu_{tk} = p(z_t = k | D_t, \tilde{\theta}) \tag{15}$$
$$= \frac{\pi_{tk} r_{tk}(\tilde{\theta})}{\sum_{k'=1}^{K_t} \pi_{tk'} r_{tk'}(\tilde{\theta})}$$

(wherein the following is satisfied:

$$r_{tk}(\theta) = \gamma^{\delta(o_t,k)}(1-\gamma)^{1-\delta(o_t,k)} \times \prod_{i \in W_t} \left[ \left(\alpha_i^{\delta(y_{it},k)}(1-\alpha_i)^{1-\delta(y_{it},k)}\right)^{\delta(\alpha_i,k)} \right. \tag{16}$$
$$\left. \left(\beta_i^{\delta(y_{it},k)}(1-\beta_i)^{1-\delta(y_{it},k)}\right)^{1-\delta(\alpha_i,k)} \right] )$$

In the formula (16) above, $r_{tk}(\theta)$ is a part that estimates a correct answer probability from the current values of the parameters taking account of the abilities of all workers. The formula (15) corresponds to weighted evaluation of each of given one or more unique answers k with the abilities ($\gamma$, $\alpha_i$ and $\beta_i$; $i \in Wt$) of the preceding-stage and succeeding-stage workers based on given work results ($y_{it}$, $o_t$) of the preceding-stage and succeeding-stage workers. In the formula (16) above, $\delta$ indicates Kronecker delta.

In the embodiment, the parameter set $\theta$ may be explicitly determined from the posterior distribution $\mu_{tk}$ at the succeeding M step as described later. Therefore, at step S105, the parameter estimation section 234 only has to calculate the posterior distribution $\mu_{tk}$ of a true correct answer $z_t$ for each of one or more tasks (t=1, . . . , n) using the current values $\theta\sim$ of the parameter set.

At step S106, the parameter estimation section 234 executes the M step in the EM algorithm. Generally, at the M step in the EM algorithm, updated values $\theta$ of the parameters that maximize the expected value R ($\theta||\theta\sim$) of the posterior probability determined at the E step, which is a function of the parameter set $\theta$. If the expected value R of the posterior probability expressed by the formula (14) described above is partially differentiated with respect to each of the parameters $\alpha_i$, $\beta_i$, $\gamma$ and $\pi_{tk}$ to be zero, updated formulas of the parameters can be obtained in closed forms as shown in the formulas (17) to (20) below. In the formulas (17) and (18) below, $T_i$ indicates a set of tasks performed by a worker i. In the formula (17) below, $\delta$ similarly indicates Kronecker delta.

$$\alpha_i = \frac{a_1 - 1 + \sum_{i \in T_i} \sum_{k=1}^{K_i} \mu_{tk} \delta(o_i, k) \delta(y_{it}, k)}{a_1 + a_2 - 2 + \sum_{i \in T_i} \sum_{k=1}^{K_t} \mu_{tk} \delta(o_t, k)} \quad (17)$$

$$\beta_i = \frac{b_1 - 1 + \sum_{i \in T_i} \sum_{k=1}^{K_i} \mu_{tk}(1 - \delta(o_i, k)) \delta(y_{it}, k)}{b_1 + b_2 - 2 + \sum_{i \in T_i} \sum_{k=1}^{K_t} \mu_{tk}(1 - \delta(o_i, k))} \quad (18)$$

$$\gamma = \frac{g_1 - 1 + \sum_{t=1}^{n} \sum_{k=1}^{K_t} \mu_{tk} \delta(o_t, k)}{g_1 + g_2 - 2 + \sum_{t=1}^{n} \sum_{k=1}^{K_t} \mu_{tk}} \quad (19)$$

$$\pi_{tk} = \frac{\mu_{tk} + \rho/K_t - 1}{\sum_{k'=1}^{K_i} (\mu_{tk'} + \rho/K_t - 1)} \quad (20)$$

That is, at step S106, the parameter estimation section 234 only has to explicitly calculate the updated values θ of the parameter set that maximize the expected value R of the posterior probability from the calculated new posterior distribution $\mu_{tk}$ of the latent variable using the updated formulas (17) to (20).

At step S107, it is determined whether or not the predetermined convergence condition is satisfied, and the loop is repeated from S104 until the predetermined convergence condition is satisfied. If the predetermined convergence condition is satisfied at step S107, the process exits the loop and proceeds to step S108.

The convergence determination can be a condition for logarithm likelihood L, for example, as expressed by the formula (21) below. In the formula (21) below, L (•) indicates the logarithm likelihood; $\theta_{old}$ means the previous values of the parameters; and $\theta_{new}$ means the latest values of the parameters. The initial value of the logarithm likelihood of $\theta_{old}$ can be set, for example, to −∞. If the logarithm likelihood is not improved by predetermined ϵ or more by the formula (21) below, it is regarded that the parameter set has converged.

$$L(\theta_{new}) - L(\theta_{old}) < \epsilon \quad (21)$$

At step S108, the parameter estimation section 234 calculates final posterior distribution $\mu_{tk}$ (k=1, ..., $K_t$) of the latent variable for each of the one or more tasks (1, ..., n) in accordance with the formula (15) above, using estimated values θ after the convergence of the parameter set. At step S109, for each of the one or more tasks, the output section 236 selects an answer k that maximizes the posterior probability $\mu_{tk}$ as a true correct answer ($z_t\hat{}$ (superscript hat)) in accordance with the formula (22) below. That is, the mode of the given latent variable under observation is selected. If there are multiple values that take the same maximum value, for example, one can be selected at random.

$$\hat{z}_t = \arg\max_k p(z_i = k \mid \{y_{it}\}_{i \in W_i}, o_t, \theta) \quad (22)$$

$$= \arg\max_k \mu_{tk} (t = 1, ..., n)$$

At step S110, the output section 236 outputs the true correct answer $z_t$ for each of the one or more tasks and the parameter set θ (including the correct answer rates $\alpha_i$ and $\beta_i$ indicating the abilities of the succeeding-stage workers) which have been obtained, and the process ends at step S111.

By the configuration described above, it becomes possible to appropriately estimate the abilities of succeeding-stage workers which may fluctuate according to the quality of a work result of a preceding-stage worker. Thereby, it is possible to appropriately model the behavior of the succeeding-stage workers influenced by seeing a work result of the preceding-stage worker and, therefore, improve the accuracy of integration of work results.

Knowledge of the abilities of workers estimated in this way may also be utilized, for example, at the time of determining by which worker a certain task is to be performed or which task a certain worker is to perform. Furthermore, the embodiment described above has an advantage that updated formulas of parameters are explicitly determined at the M step of the EM algorithm. Furthermore, since the number of parameters introduced into a model is small, there are also advantages of being robust against sparseness of data and not requiring a long time for calculation.

A method is also conceivable in which, by regarding the task for which a preceding-stage worker gives an incorrect answer, which has been described above, simply as a task with a high degree of difficulty, the task is incorporated into, for example, the model of J. Whitehill, et al., "Whose Vote Should Count More?: Optimal Integration of Labels from Labelers of Unknown Expertise.", NIPS, Vol. 22, pp. 2035-2043, 2009, December. In this case, however, there is a tendency that, for a task with a high degree of difficulty, the estimated values of the abilities of workers are difficult to be reflected on difference among correct answer rates, and a weighted majority vote is in a form closer to a common majority vote. In comparison, by introducing parameters of the abilities of workers conditioned according to the qualities of work results of a preceding-stage worker into a generative model, the effect of the qualities of the work results of the preceding-stage worker counteracting variation among the abilities of the workers is eliminated, and, thereby, a weighted majority vote according to the abilities of the workers becomes possible.

In the parameter estimation method according to the embodiment described above, a true correct answer $z_t$ for all n tasks and a parameter set θ are estimated with the use of n task logs prepared in advance. However, such an embodiment of batch learning is not limiting. In another embodiment, an aspect of performing so-called sequential learning or online learning is also possible in which, under a situation of work results for a task being sequentially generated from a preceding-stage worker and succeeding-stage workers, a true correct answer $z_t$ for the task is estimated while the parameter set θ is updated, each time data is given.

Further, in the generative model shown in FIG. 4 in the embodiment described above, description has been made on the assumption that the automatic recognition section 210, which is an OCR engine, works as a preceding-stage worker and the workers (that are generally persons) operating the worker terminals 104 as succeeding-stage workers. Further, in the embodiment described above, it is assumed that the preceding-stage worker is the same in all tasks, and the correct answer rate γ of the preceding-stage worker, which is task-independent, is introduced as a parameter, for convenience of the description.

However, the specific workflow described above is not limiting. For example, in another embodiment, the preceding-stage worker may be a worker who operates the worker terminal 104. Further, in another embodiment, the preceding-stage worker differs for each task, and the correct answer rate $\gamma_t$ of the preceding-stage worker for each task may be introduced as a parameter.

Furthermore, in the generative model shown in FIG. 4, the correct answer rates $\alpha_i$ and $\beta_i$ for each worker are used as the abilities of succeeding-stage workers. It is more preferable to indicate the ability of each worker by a different parameter from the viewpoint of modeling the abilities of workers in detail. However, in another embodiment, modeling may be performed such that correct answer rates $\alpha$ and $\beta$ indicating a uniform ability of workers as a whole are used. Furthermore, in another embodiment, modeling may be performed such that correct answer rates $\alpha_{it}$ and $\beta_{it}$ indicating abilities for each worker and for each task are used from the viewpoint of modeling the abilities of workers in more detail.

Further, in the embodiment described above, two kinds of correct answer rates $\alpha$ and $\beta$ indicating the ability of a succeeding-stage worker conditioned by whether or not an answer of a preceding-stage worker is correct are introduced. However, conditioning of the abilities of the succeeding-stage workers is not limited to such an aspect. In another embodiment, the abilities of the succeeding-stage workers can be further conditioned by the kind and individual of the preceding-stage worker or any of them. For example, parameters indicating the ability of a succeeding-stage worker conditioned by whether the preceding-stage worker is a machine or a person can be introduced. For example, parameters indicating the ability of a succeeding-stage worker conditioned by which automatic recognition engine or which person the preceding-stage worker is can be introduced. Furthermore, in addition to conditioning by two stages of whether or not an answer of the preceding-stage worker is correct, conditioning by three or more stages is not impossible in another embodiment.

Further, in the generative model shown in FIG. 4, a workflow in which one or more succeeding-stage workers work based on a work result by one preceding-stage worker is described as an example. However, in another embodiment, a workflow is also possible in which one or more succeeding-stage workers work based on work results of multiple preceding-stage workers, or such a gradual workflow is not impossible that a second worker works based on a work result of a first worker, and a third worker works based on a work result of the second worker.

In the description with reference to FIG. 5, MAP estimation is performed by applying an EM algorithm based on a generative model as shown in FIG. 4 in which a latent variable and a parameter set are introduced. The MAP estimation has an advantage that a solution may be determined more stably. However, the embodiment of the MAP estimation is not limiting. In another embodiment, it is also possible to apply an EM algorithm and perform maximum likelihood (ML) estimation based on a generative model.

Furthermore, in the embodiment described above, the degree of difficulty of a task is not taken account of. In another embodiment, however, a configuration is also possible in which a parameter of the degree of task difficulty $d_t$ for each task t is introduced to estimate the degree of task difficulty $d_t$ together. Otherwise, it is also possible to introduce the abilities of succeeding-stage workers conditioned by the qualities of work results of a preceding-stage worker as parameters into the algorithm for estimating the degree of task difficulty disclosed in J. Whitehill, et al., "Whose Vote Should Count More?: Optimal Integration of Labels from Labelers of Unknown Expertise.". NIPS, Vol. 22, pp. 2035-2043, 2009, December. In that case, the correct answer rate $p(y_{it}=z_t)$ is conditioned by whether or not the preceding-stage worker gives a correct answer, and can be expressed by the formulas (23) and (24) below, wherein the skills of the worker are indicated by $\alpha_i$ and $\beta_i$.

$$p(y_{it}=z_t \mid o_t=z_t) = \frac{1}{1+\exp(-\alpha_i d_t)}$$

$$p(y_{it}=z_t \mid o_t \neq z_t) = \frac{1}{1+\exp(-\beta_i d_t)}$$

Figure 6:
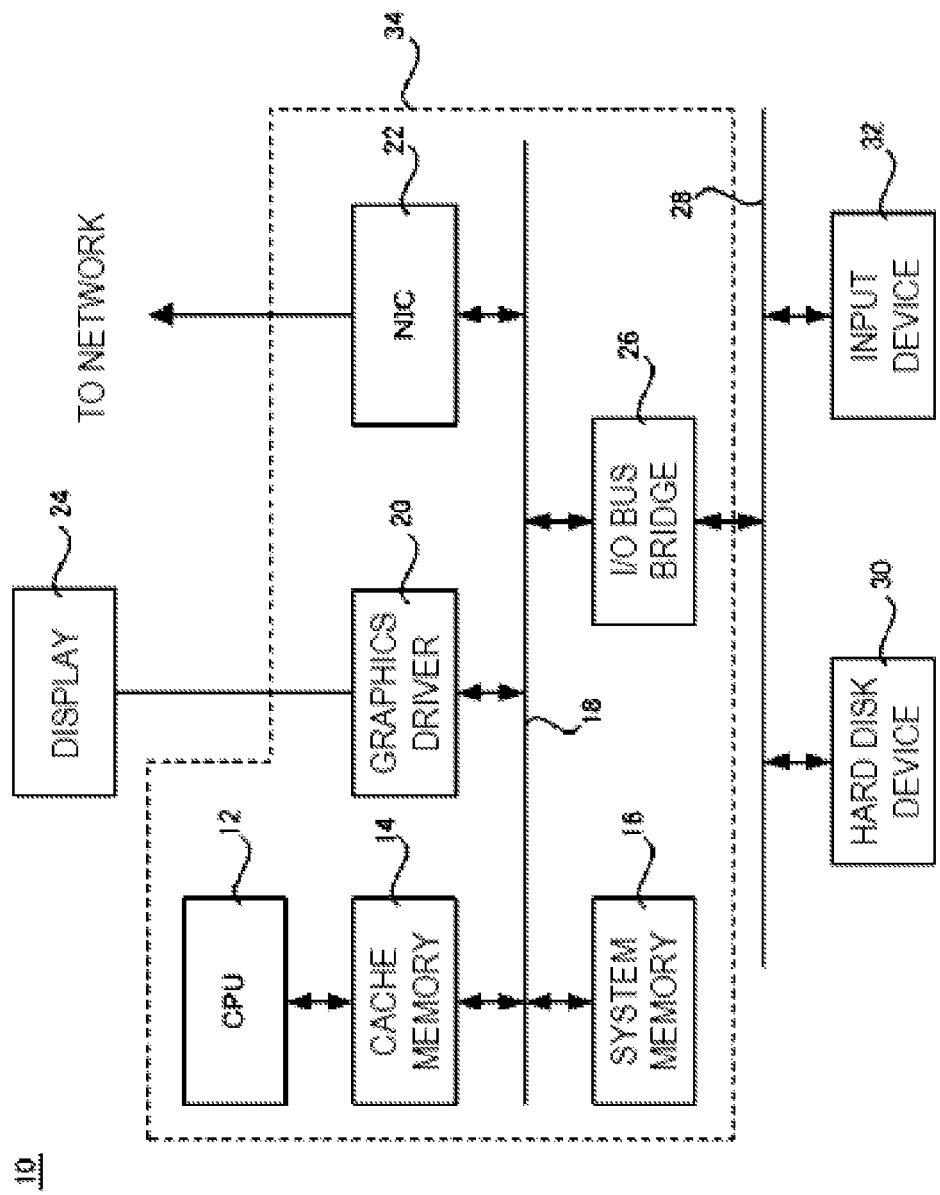
FIG. 6 is a schematic hardware configuration diagram of a computer apparatus that realizes a management server according to one embodiment.

A computer apparatus that realizes the management server 110 according to the embodiment above is described below. FIG. 6 shows a schematic hardware configuration of the computer apparatus that realizes the management server 110 according to one embodiment. The computer apparatus 10 shown in FIG. 6 is provided with a central processing unit (CPU) 12, which is a processor, a cache memory 14 having a level such as L1 or L2 enabling high-speed access to data used by the CPU 12, and a system memory 16 formed by a solid-state memory device such as a DRAM enabling process by the CPU 12.

The CPU 12, the cache memory 14 and the system memory 16 are connected to other devices or drivers, for example, a graphics driver 20 and a network interface card (NIC) 22 via a system bus 18. The graphics driver 20 is connected to an external display 24 via the bus and can display a result of processing by the CPU 12 on a display screen. The NIC 22 connects the computer apparatus 10 to a network 102 that uses an appropriate communication protocol such as TCP/IP at the physical layer level and the data link layer level.

An I/O bus bridge 26 is further connected to the system bus 18. On the downstream side of the I/O bus bridge 26, a hard disk device 30 is connected by IDE, ATA, ATAPI, serial ATA, SCSI, USB or the like via an I/O bus 28 such as a PCI. The hard disk device 30 can store, for example, task data 112, task logs 114 and work product data 116. Further, an input device 32 such as a pointing device, such as a keyboard and a mouse, is connected to the I/O bus 28 via a bus such as a USB, and a user interface is provided by this input device 32.

As the CPU 12 of the computer apparatus, any single-core or multi-core processor may be used. The computer apparatus is controlled by an operating system (hereinafter referred to as an OS) such as Windows® 200X, UNIX® and LINUX®. The computer apparatus realizes the configuration and processing of the function sections described above by developing a program on the system memory 16 or the like under the control of the above OS, executing the program and controlling operation of each hardware resource.

As described below, an experiment was conducted using actual task logs about succeeding-stage workers having performed modification of wrong recognition for an OCR recognition result of a preceding stage. First, character recognition of image data of a book was performed by two OCR engines, and character images for which the two OCR engines had given different answers were extracted. Then, an OCR recognition result and multiple extracted character images for which the common recognition result had been given were displayed via a character proofreading interface screen as shown in FIG. 3, and the workers were caused to input correct recognition results. The answers of one of the two OCR engines was displayed on the character proofreading interface screen.

The number of the workers was 42. Each of 39,176 unique tasks was allocated to one to three workers, and work results for a total of 116,662 tasks were obtained. In the character proofreading log data described above, how and which character was modified and by which worker the character was modified is recorded in a log format, and the log data corresponds to 116,662 lines. A descriptive statistics thereof is shown in Table 1 below. In this experiment, true correct answers indicated by the character images are already known, and, therefore, various estimated values obtained by parameter estimation can be compared with actually measured values.

TABLE 1

| | |
|---|---|
| The number of workers in | 42 |
| The number of tasks n | 39176 |
| The number of tasks per worker (maximum) | 21045 |
| The number of tasks per worker (average) | 2301 |
| The number of workers per task | 1-3 |
| The number of tasks for which OCR gave a correct answer | 29381 |

Experiment Example 1

Figure 7:
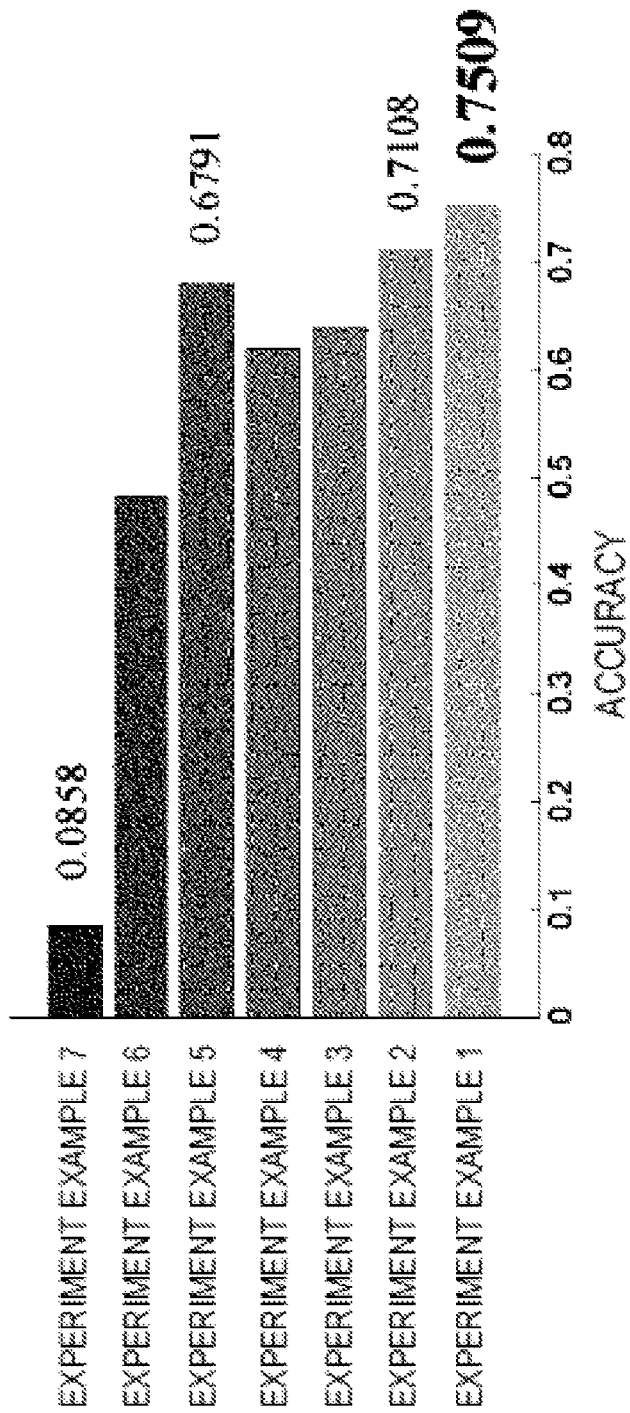
FIG. 7 is a horizontal bar chart showing accuracy calculated for a set of tasks for which different responses are obtained from workers in experiment examples.

A management server 110 implemented with the parameter estimation method shown in FIG. 5 was constructed with a personal computer. The parameter estimation process was executed for the task logs described above with the use of the generative model shown in FIG. 4 in which the correct answer rates $\alpha_i$ and $\beta_i$ for each worker are introduced as parameters, and the accuracy of estimated answers corresponding to a known true correct answer was evaluated. The accuracy was calculated by counting the number of times of an estimated answer corresponding to a true correct answer and dividing the number of times by a sum total of tasks n. When this calculation was performed for all the tasks for the experiment example 1, the accuracy was 0.9691. Furthermore, when tasks for which different answers had been obtained from the workers were extracted, and the accuracy was calculated for 2.344 such tasks extracted from among the total of 39,176 tasks, the accuracy was 0.7509. FIG. 7 shows the accuracy determined for a set of the tasks for which different answers had been obtained from the workers in the experiment example 1. The experiment example 1 constitutes an implementation example.

Experiment Example 2

A management server 110 was constructed with the same computer as the experiment example 1, the management server 110 being implemented with the same parameter estimation method as the experiment example 1 except for a point that the correct answer rates of the workers were uniform, that is, worker-independent correct answer rates $\alpha$ and $\beta$ were used as parameters. The parameter estimation method was executed for the task logs described above to calculate accuracy. The accuracy of all the tasks was 0.9664. When accuracy was determined for the same set of the tasks as the experiment example 1 for which different answers had been obtained from the workers, the accuracy was 0.7108. FIG. 7 shows the accuracy determined for the set of the tasks for which different answers had been obtained from the workers in the experiment example 2. The experiment example 2 constitutes an implementation example.

Experiment Example 3

A management server 110 was constructed with the same computer as the experiment example 1, the management server 110 being implemented with the same parameter estimation method as the experiment example 1 except for a point that conditioning by whether or not an OCR recognition result had been correct was not performed, but one kind of correct answer rate $s_i = p$ $(y_{it} = z_t)$ for each worker was introduced as a parameter. This corresponds to what is obtained by a simplified latent class model (LC). Further, although a recognition result of the OCR engine can be also considered as an answer by a worker in such a model, the OCR engine was not included in the workers, and only results by the human workers were integrated in the experiment example 3. The parameter estimation method was executed for the task logs described above, and accuracy was determined for the same set of the tasks as the experiment example 1 for which different answers had been obtained from the workers. FIG. 7 shows the accuracy determined for the set of the tasks for which different answers had been obtained from the workers in the experiment example 3. The experiment example 3 constitutes a comparison example.

Experiment Example 4

An experiment example 4 is the same as the experiment example 3 except that an OCR recognition result was included in answers by the workers, and results by the workers including the OCR engine were integrated. FIG. 7 shows the accuracy determined for a set of tasks for which different answers had been obtained from the workers in the experiment example 4. The experiment example 4 constitutes a comparison example.

Experiment Example 5

The same computer as the experiment example 1 was used to implement a program for integrating tasks by majority voting, and, for the task logs described above, the accuracy of an answer determined according to majority voting corresponding to a known true correct answer was evaluated. In the experiment example 5, the OCR engine was not included in the workers, and only results by the human workers were integrated. The accuracy of all the tasks was 0.9662. When accuracy was determined for the same set of the tasks as the experiment example 1 for which different answers had been obtained from the workers, the accuracy was 0.6791. FIG. 7 shows the accuracy determined for the set of the tasks for which different answers had been obtained from the workers in the experiment example 5. The experiment example 5 constitutes a comparison example.

Experiment Example 6

An experiment example 6 is the same as the experiment example 5 except for a point that an OCR recognition result was included in answers by the workers, and results by the workers including the OCR engine were integrated. FIG. 7 shows the accuracy determined for the set of the tasks for which different answers had been obtained from the workers in the experiment example 6. The experiment example 6 constitutes a comparison example.

Experiment Example 7

Estimation was performed with an answer of the OCR engine regarded as a correct answer as it was, and the accuracy of corresponding to a known true correct answer was evaluated. The accuracy of all the tasks was 0.7499, and the accuracy for the same set of the tasks as the experiment example 1 for which different answers had been obtained from the workers was 0.0858. FIG. 7 shows the accuracy determined for the set of the tasks for which different answers had been obtained from the workers in the experiment example 7. The experiment example 7 constitutes a comparison example.

Comparison Among Experiment Examples 1 to 7

When the experiment results of the experiment examples 1 to 7 are compared, the accuracy for a set of all the tasks in the experiment example 1 is improved by about 0.3% even when compared with the experiment example 5, the result of which is the best among the experiment examples 3 to 7. Referring to FIG. 7, it is understood that, especially with regard to the set of the tasks for which different answers were obtained from the workers, the accuracy is improved by more than 7% in the experiment example 1 even when compared with the experiment example 5, which shows the best accuracy among the comparison examples. It is understood that, in the experiment example 2 also, the accuracy is improved by more than 3% when compared with the experiment example 5, which shows the best accuracy among the comparison examples. That is, it is shown that, by conditioning the abilities of workers by the qualities of work results of a preceding stage, a true correct answer can be estimated with higher accuracy, and the accuracy is significantly improved for such a task with a high degree of difficulty that different answers are obtained from the workers.

Experiment Example 8

When workers who satisfied a condition that had performed two hundred or more tasks for which the OCR engine had given an answer corresponding to a known true correct answer and had performed two hundred or more tasks for which the OCR engine had given an incorrect answer were extracted from all the workers in the log data described above, nineteen workers among the total of forty-two workers were extracted.

Figure 8:
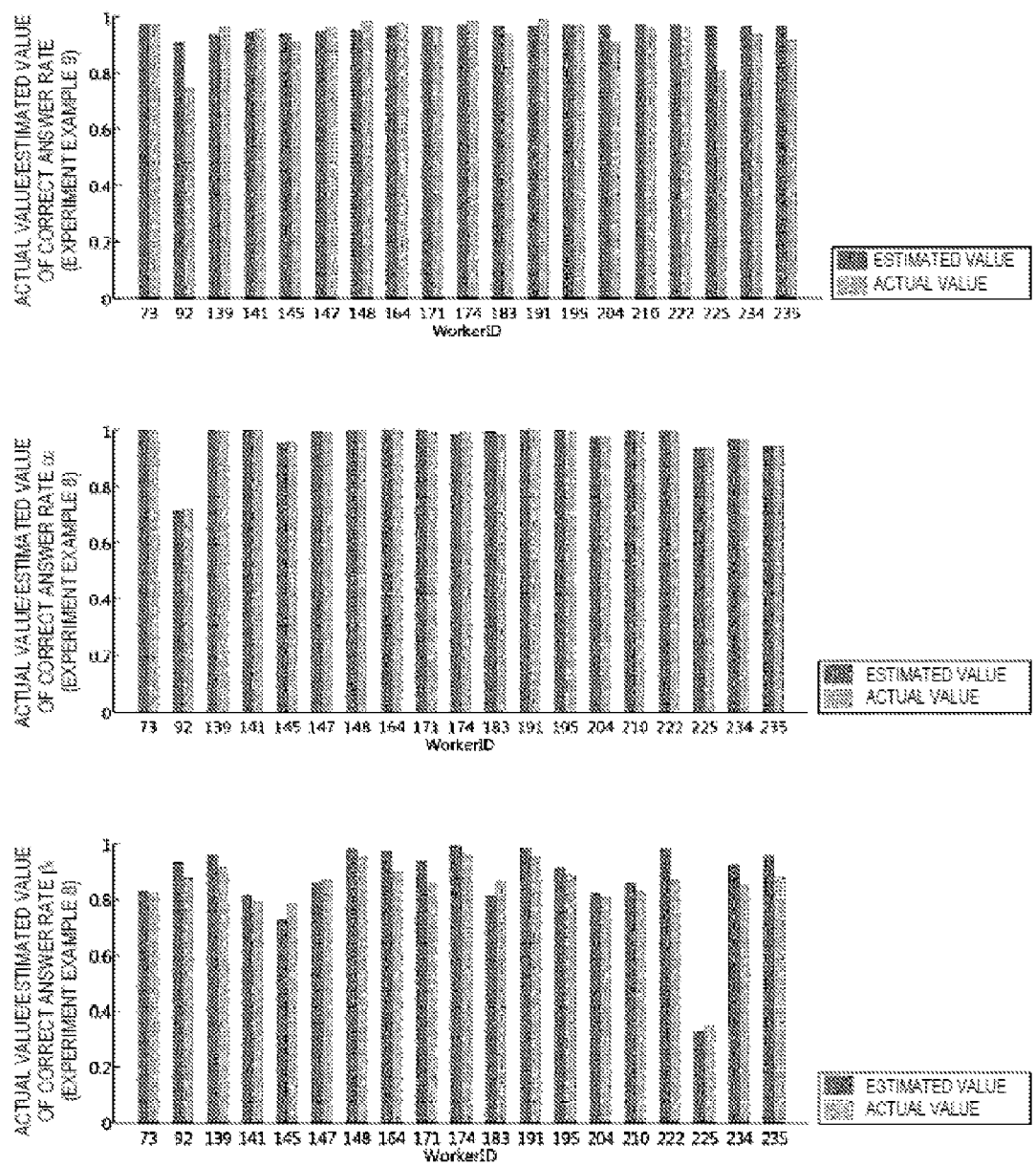
FIG. 8 has three vertical bar charts showing an estimated value and a measured value side by side, for a correct answer rate $s_i$ of workers in experiment example 9, a correct answer rate $\alpha_i$ in a case where a preceding-stage of the workers in experiment example 8 gives a correct answer, and a correct answer rate $\beta_i$ in the case where the preceding-stage of the workers in experiment example 8 gives an incorrect answer, respectively.

The middle chart in FIG. 8 shows a result of comparing, for each of the above nineteen workers, an estimated value of a correct answer rate $\alpha_i$ when the OCR engine gave a correct answer, which is estimated by the parameter estimation method of the experiment example 1, and an actually measured value. Similarly, the bottom chart in FIG. 8 shows a result of comparing an estimated value of a correct answer rate $\beta_i$ when the OCR engine gave an incorrect answer and an actually measured value. Furthermore, when an RMSE (Root-Mean-Square Error) was calculated in order to evaluate the level of estimation of the estimated value of the correct answer rate $\alpha_i$ in the case where the OCR engine had given a correct answer, which was calculated in the experiment example 8, relative to the actually measured value, the RMSE was 0.0045. Similarly, when a rank correlation coefficient was calculated, it was 0.9211. When an RMSE and a rank correlation coefficient were calculated in order to evaluate the level of estimation of the estimated value of the correct answer rate $\beta_i$ in the case where the OCR engine had given an incorrect answer, which was calculated in the experiment example 8, relative to the actually measured value, the RMSE and the rank correlation coefficient were 0.0522 and 0.8649, respectively. The experiment example 8 constitutes an implementation example.

Experiment Example 9

The upper chart in FIG. 8 shows a result of comparing, for the same set of workers as the experiment example 8 above, an estimated value of the correct answer rate $s_i$ for each worker estimated in the simplified latent class model of the experiment example 3 above and an actually measured value. Furthermore, when an RMSE and a rank correlation coefficient were calculated in order to evaluate the level of estimation of the estimated value of the correct answer rate $s_i$ calculated in the experiment example 9, relative to the actually measured value, the RMSE and the rank correlation coefficient were 0.0584 and 0.3228, respectively. The experiment example 9 constitutes a comparison example.

Comparison Between Experiment Examples 8 and 9

As shown in the upper chart of FIG. 8, there was a case where the correct answer rate $s_i$ for each worker was not obtained with high accuracy in the experiment example 9. For example, referring to the upper chart of FIG. 8, it is seen that a correct answer rate $s_i$ that is higher than an actual value is estimated for workers 92 and 225. In comparison, as apparent from referring to the middle and bottom charts of FIG. 8, it is seen that correct answer rates $\alpha_i$ and $\beta_i$ are estimated with high accuracy for all the targeted workers in the experiment example 8.

It is thought that this is because the correct answer rate of the worker 92 is low when the OCR engine gives a correct answer, and, on the contrary, the correct answer rate of the worker 225 is low when the OCR engine gives an incorrect answer.

Furthermore, as for the RMSE and the rank correlation coefficient, it can be said that estimation is better as the value of the RMSE is closer to zero, because the RMSE indicates an absolute error between estimated and actual values; and it can be said that estimation is better as the value of the rank correlation coefficient is closer to one, because the rank correlation coefficient indicates the degree of similarity between ranking by an estimated value and ranking by an actual value. When the RMSE and the rank correlation coefficient are compared in the experiment examples 8 and 9, it is seen that, as for the correct answer rate $\alpha_i$ in the case of the preceding-stage giving a correct answer, both of the RMSE and the rank correlation coefficient are significantly improved. When compared as for the correct answer rate $\beta_i$ in the case of the preceding stage giving an incorrect answer, it is seen that the RMSE is equal to the correct answer rate $\beta_i$ in the experiment example 9, but the rank correlation coefficient is improved. In the experiment example 9, there is a tendency of excessively evaluating a worker whose actual correct answer rate is low, and it is thought that the reason is that a correct answer rate is influenced by the correct answer rate of a worker who gives a lot of answers and has a high correct answer rate. In comparison, it can be thought that, in the experiment example 8, the effect of being influenced as the number of answers decreases is reduced.

As described above, according to one embodiment, it is possible to provide an estimation method, an estimation system, a computer system and a program capable of estimating abilities of succeeding-stage workers that may fluctuate according to the quality of a work result of a preceding-stage worker. Furthermore, according to one embodiment, it is possible to provide a program for performing a process for integrating work results of multiple workers while estimating the abilities of the succeeding-stage workers which may fluctuate according to the quality of a work result of the preceding-stage worker.

The estimation method and the like described above can be applied not only to quality management in a process for integrating work results of multiple workers in crowdsourcing and the like but also to education of multiple workers, for example, by giving feedback about estimated abilities of the multiple workers.

Each function section and a process of each function section have been described in order to facilitate understanding of the embodiments described herein. In one embodiment, however, in addition to the particular function sections described above executing particular processes, it is possible to determine to which function sections functions for executing the processes described above are to be assigned in consideration of efficiency of processing and efficiency of programming or the like for implementation.

The above functions may be realized by an apparatus-executable program written, for example, in an object-oriented programming language such as C++, Java®, Java® Beans, Java® Applet, JavaScript®, Perl, Python and Ruby, and it can be stored in an apparatus-readable recording medium and distributed or can be distributed through transmission.

The present invention has been described with particular embodiments. The present invention, however, is not limited to the embodiments described herein and may be changed within a range that one skilled in the art may think of, such as other embodiments, addition, modification and deletion. Any aspect is included in the scope of the present invention as far as the operation/effects of the present invention may be obtained.

What is claimed is:

1. A computer-implemented method for estimating an ability of a worker in a process for integrating work results of multiple workers for the same task, the method comprising:
processing, by an optical character recognition (OCR) engine, character recognition task data;
logging, in response to the processing, the processed character recognition task data, in a task log;
receiving, by a computer system and for each of one or more tasks, a work result of the OCR engine from the task log, and a work result of a succeeding-stage worker that works based on the work result of the OCR engine
estimating multiple parameters of a probability model in which an ability of the succeeding-stage worker conditioned by a quality of the work result of the OCR engine is introduced as a conditioned ability parameter, based on the multiple work results obtained for each of the one or more tasks, wherein the probability model is a generative model that includes, for each of the one or more tasks, a work result of each of one or more preceding-stage workers, including the OCR engine, as a first observed variable, a work result of each of one or more succeeding-stage workers as a second observed variable, and a work result to be obtained as a latent variable, and wherein estimating the multiple parameters comprises:
calculating, for each of the one or more tasks, the work result to be obtained, based on a current value of each of the multiple parameters;
calculating a new value of each of the multiple parameters based on the calculated work result to be obtained for each of the one or more tasks; and
determining whether or not a convergence condition is satisfied.

2. The estimation method according to claim 1, further comprising:
calculating, for each of the one or more tasks, a posterior probability of each of one or more given unique work results being the work result to be obtained, based on an estimated value of each of the multiple parameters of the probability model; and
outputting, for each of the one or more tasks, a work result that maximizes the posterior probability from among the one or more given unique work results as the work result to be obtained.

3. The estimation method according to claim 1, wherein the conditioned ability of the succeeding-stage worker includes, for each condition, an ability of the workers as a whole, an ability of each worker, or an ability of each worker for each task.

4. The estimation method according to claim 1, wherein the conditioned ability of the succeeding-stage worker includes, for each condition, the ability of each worker.

5. The estimation method according to claim 1,
wherein the work result of a worker is an answer of the worker to a task,
wherein the work result to be obtained is a true correct answer of the task, and
wherein the conditioned ability of the succeeding-stage worker includes a probability of the succeeding-stage worker giving the correct answer under a condition that an answer of the OCR engine is correct, and a probability of the succeeding-stage worker giving the correct answer under a condition that the answer of the OCR engine is incorrect.

6. The estimation method according to claim 1, wherein the multiple parameters of the probability model further include a degree of task difficulty.

7. The estimation method according to claim 1, wherein estimating the multiple parameters includes estimating a value of each of the multiple parameters that maximizes a posterior probability of the multiple parameters on condition that the work results of the preceding-stage and succeeding-stage workers for each of the one or more tasks are given.

8. The estimation method according to claim 1, wherein calculating the work result to be obtained comprises performing, for each of the tasks, weighted evaluation of each of given one or more unique work results by the ability of the preceding-stage and succeeding-stage workers as a whole based on a given work result of each of the preceding-stage and succeeding-stage workers.

9. The estimation method according to claim 1, wherein calculating the new value of each of the multiple parameters comprises explicitly determining, for at least the multiple parameters indicating the conditioned ability of the succeeding-stage worker, a new value from the work result to be obtained, which is calculated in a form of posterior distribution in calculating the work result to be obtained.

10. The estimation method according to claim 1, wherein the succeeding-stage worker is a person.

11. An estimation system for estimating an ability of a worker in a process for integrating work results of multiple workers for the same task, wherein the estimation system is executed over a processing circuit, the system comprising:
- an acquisition section configured to acquire, for each of one or more tasks, a work result of an optical character recognition (OCR) engine and a work result of a succeeding-stage worker that works based on the work result of the OCR engine and
- an estimation section configured to estimate multiple parameters of a probability model in which an ability of the succeeding-stage worker conditioned by a quality of the work result of the OCR engine is introduced as a parameter, based on the multiple work results obtained for each of the one or more tasks, wherein the probability model is a generative model that includes, for each of the one or more tasks, a work result of each of one or more preceding-stage workers, including the OCR engine, as a first observed variable, a work result of each of one or more succeeding-stage workers as a second observed variable, and a work result to be obtained as a latent variable, and wherein estimating the multiple parameters comprises:
- calculating, for each of the one or more tasks, the work result to be obtained, based on a current value of each of the multiple parameters;
- calculating a new value of each of the multiple parameters based on the calculated work result to be obtained for each of the one or more tasks; and
- determining whether or not a convergence condition is satisfied.

12. The estimation system according to claim 11,
wherein the probability model is a generative model that includes, for each of the one or more tasks, a work result of each of the preceding-stage workers as a first observed variable, a work result of each of one or more succeeding-stage workers as a second observed variable, and a work result to be obtained, as a latent variable; and wherein the estimation system further comprises an output section configured to output, for each of the one or more tasks, a work result that maximizes a posterior probability calculated based on an estimated value of each of the multiple parameters, from among one or more given unique work results as the work result to be obtained.

13. A computer-readable program product for estimating an ability of a worker in a process for integrating work results of multiple workers for the same task, the program product causing a computer system to function as:
- an acquisition section configured to acquire, for each of one or more tasks, a work result of an optical character recognition (OCR) engine, and a work result of a succeeding-stage worker that works based on the work result of the OCR engine; and
- an estimation section configured to estimate multiple parameters of a probability model in which an ability of the succeeding-stage worker conditioned by a quality of the work result of the OCR engine is introduced as a parameter, based on the multiple work results obtained for each of the one or more tasks, wherein the probability model is a generative model that includes, for each of the one or more tasks, a work result of each of one or more preceding-stage workers, including the OCR engine, as a first observed variable, a work result of each of one or more succeeding-stage workers as a second observed variable, and a work result to be obtained as a latent variable, and wherein estimating the multiple parameters comprises:
- calculating, for each of the one or more tasks, the work result to be obtained, based on a current value of each of the multiple parameters;
- calculating a new value of each of the multiple parameters based on the calculated work result to be obtained for each of the one or more tasks; and
- determining whether or not a convergence condition is satisfied.

* * * * *